United States Patent
Ezrielev et al.

(10) Patent No.: US 12,483,468 B2
(45) Date of Patent: Nov. 25, 2025

(54) EMPLOYING REDUNDANT DEVICES IN A DEPLOYMENT

(71) Applicant: Dell Products L.P., Round Rock, TX (US)

(72) Inventors: Ofir Ezrielev, Beer Sheva (IL); Boris Shpilyuck, Ashdod (IL); Igor Dubrovsky, Beer Sheva (IL); Nisan Haimov, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 325 days.

(21) Appl. No.: 18/345,314

(22) Filed: Jun. 30, 2023

(65) Prior Publication Data

US 2025/0007773 A1 Jan. 2, 2025

(51) Int. Cl.
*H04L 41/0663* (2022.01)
*H04L 41/22* (2022.01)

(52) U.S. Cl.
CPC .......... *H04L 41/0663* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 11,159,609 B2 | 10/2021 | McGrath et al. | |
| 11,218,546 B2 | 1/2022 | Spoczynski et al. | |
| 11,366,694 B1 | 6/2022 | Aronovich | |
| 11,652,872 B1 | 5/2023 | Parla et al. | |
| 2014/0108347 A1* | 4/2014 | Lee | H04L 43/0811 707/E17.005 |
| 2017/0061351 A1 | 3/2017 | Lee | |
| 2017/0076408 A1 | 3/2017 | D'Souza | |
| 2020/0379999 A1 | 12/2020 | Xia | |
| 2021/0011448 A1 | 1/2021 | Coleman | |
| 2021/0398187 A1 | 12/2021 | Tennur Narayanan | |
| 2021/0406976 A1 | 12/2021 | Sethi | |
| 2022/0179692 A1 | 6/2022 | Aronovich | |
| 2022/0179697 A1 | 6/2022 | Kumar et al. | |
| 2022/0376971 A1* | 11/2022 | Xiao | H04L 41/069 |
| 2024/0121178 A1* | 4/2024 | Liu | H04L 45/22 |

* cited by examiner

*Primary Examiner* — Angela Nguyen

(74) *Attorney, Agent, or Firm* — WOMBLE BOND DICKINSON (US) LLP

(57) ABSTRACT

Methods and systems for managing operation of a deployment are disclosed. The deployment may be managed by employing redundant devices within the deployment. The redundant devices may serve to replace operation of failed devices. Despite replacement of operations of a failed device, the redundant device may not have similar functionality as the failed device. To make the functionality similar to the failed device, a correction factor may be applied to the redundant device. In applying the correction factor, the output from the redundant device may be expected to match output from the failed device. In matching output from the failed device, the redundant device may operate in place of the failed device.

20 Claims, 10 Drawing Sheets

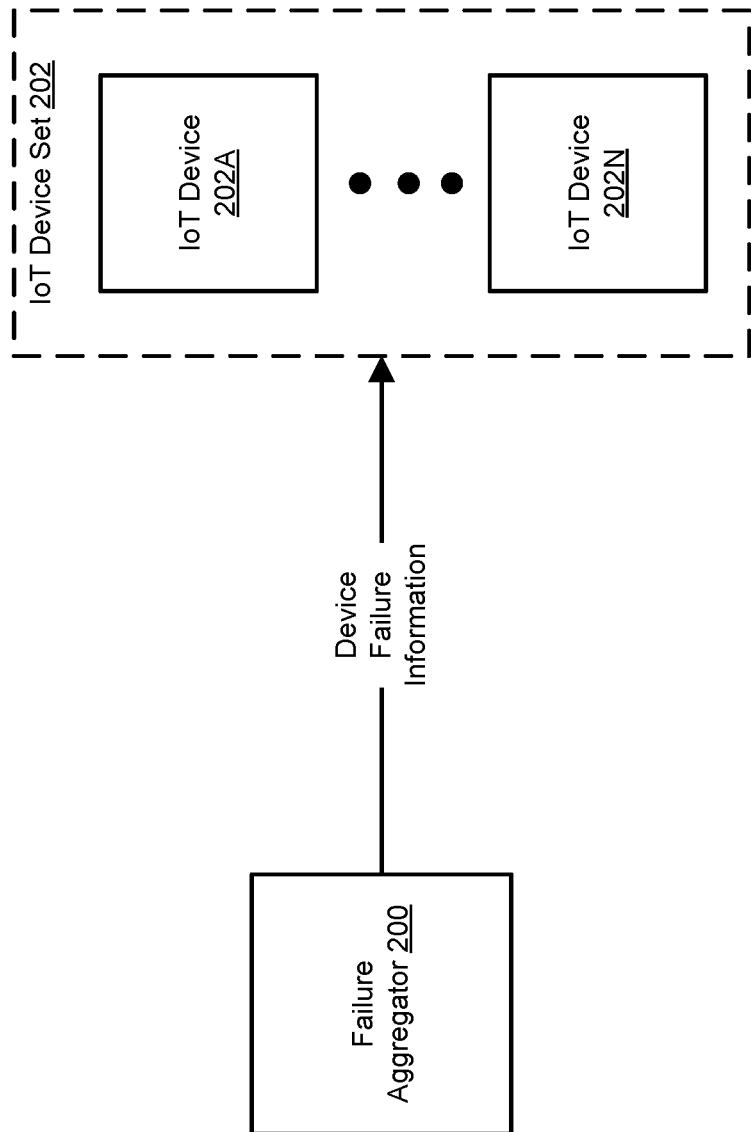

EMPLOYING REDUNDANT DEVICES IN A DEPLOYMENT

FIELD

Embodiments disclosed herein relate generally to device management. More particularly, embodiments disclosed herein relate to employing redundant devices in a deployment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2A shows a first data flow diagram illustrating operation of a portion of a system in accordance with an embodiment.

DETAILED DESCRIPTION

Figure 1:
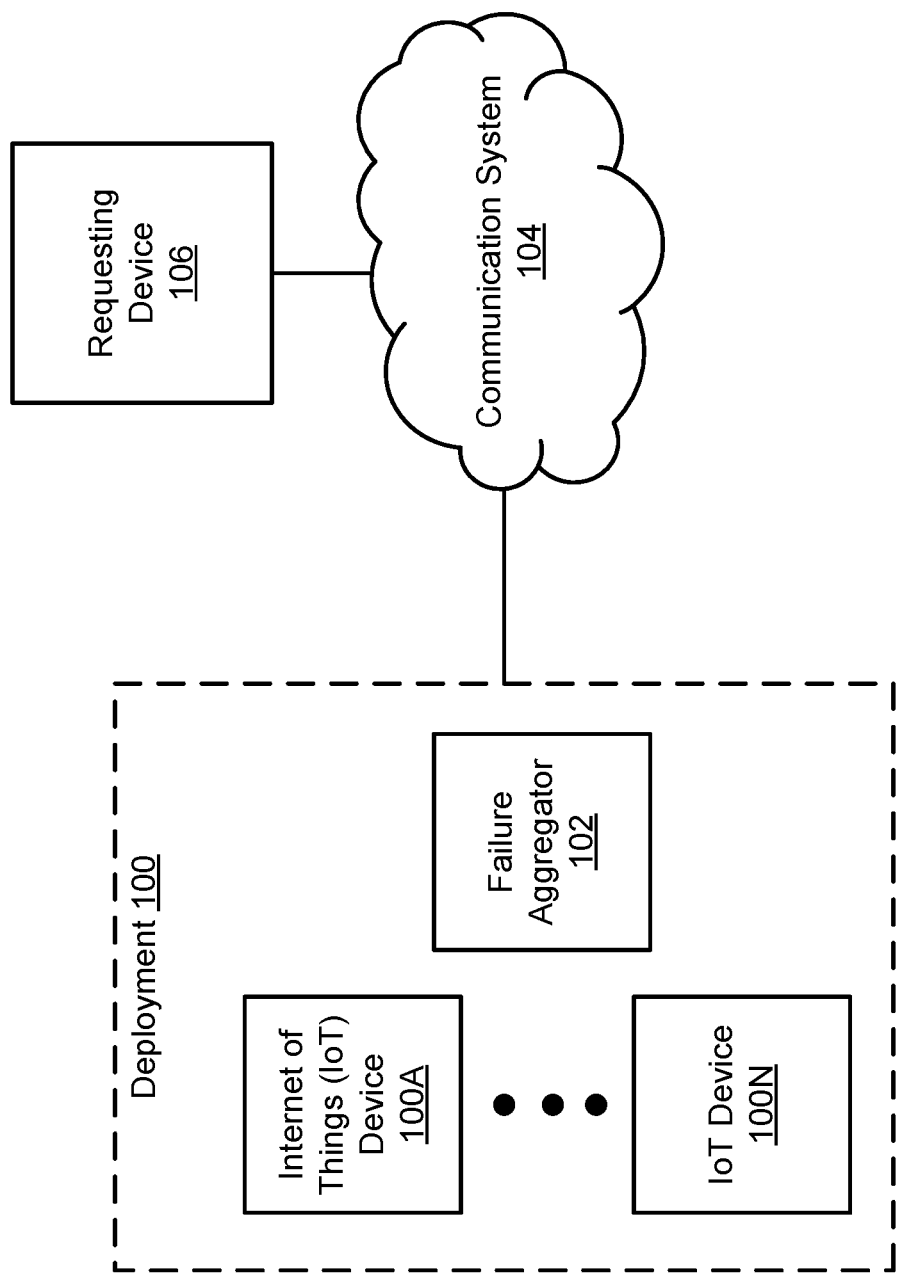
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to the methods and systems related to managing failure of devices in deployment. A deployment may host one or more within a set of devices within a network of devices. The network of devices may include sensors that read data from the outside world and data processing tools that process data into varying formats for processing by other devices or human-readable formats. In a human-readable format, the data may be sent through a communications device to an end user. The communications device may include a network through which to transmit data or the Internet. Inclusion of the communications device between the deployment and the end user may be such that the end user may not need to be within local proximity of the deployment. In not needing to be within local proximity of the deployment, the end user may not need to be within local proximity of the devices. In not needing to be within local proximity of the devices, an end user may expect to employ the deployment at any location as long as the end user may maintain a connection with the communications device. However, should any of the devices experience a failure of operation, maintenance and remediation of the devices may require intervention by the end user. In requiring intervention by the end user, convenience of remote design of the deployment may be removed. In removing the remote design of the deployment, human intervention, by an administrator or end user, may be required when maintenance or remediation of one or more devices may be needed.

To maintain the remote design of the deployment, even when maintenance or remediation may be needed, the concept of the failure aggregator may be introduced. The failure aggregator may be a device that may exist among the set of devices within a network of devices in the deployment. The failure aggregator may catalogue failures of operation of the devices within a deployment. To catalogue failures of operation, the failure aggregator may require a device to send notice of failure of operation when the device fails to operate. Also, to catalogue failures of operation, the failure aggregator may require a device to send notice of failure of operation concerning other devices with which it may share an operational connection.

In cataloguing failures of operation, the failure aggregator may generate a network map of operational connections between devices. If queried by a device, the failure aggregator may parse the network map and send operational pathways from the network map that may be applicable to the device. In receiving operational pathways, the device may understand what pathways include functional devices and devices with failures of operation. In knowing the contents of pathways, a device may decide which pathway to use to execute operations.

The failure aggregator may also use the catalogue of failures of operation to initiate remediation. In initiating remediation, the failure aggregator may employ tools not involving human intervention. Such tools may comprise (i) fixing drones, (ii) device redundancies within the deployment, and (iii) severing of operational connections. By employing these tools, the deployment may maintain a remote layout and not require human intervention when one or more devices experience failures of operation In the event of a failure of operation by a failed device, a device may utilize a redundant device along a pathway from the network map. However, the redundant device may not be duplicative in functionality to the failed device. To maintain similarity between the failed device and redundant device, a machine learning model may be employed. In employing a machine learning model, the model may absorb stored data sets from the failed device and redundant device. In absorbing stored data sets from both devices, the machine learning model may learn differences in the outputs of both devices. In learning differences from both devices, the machine learning model may learn differences in functionality between both devices. In learning differences in functionality, the machine learning model may generate a correction factor. The correction factor may be applied to the redundant device to modify its functionality in order to correct its programming. The correction to the programming of the redundant device may cause the redundant device to include functionality that may be equipped to generate output data similar to the failed device. Thus, the correction factor may transform the redundant device to function similarly to the failed device.

In an embodiment, a method for securing a deployment is provided. The method may include (i) obtaining data regarding failures of operation of a set of devices within a network of devices, (ii) storing the data within a first device, the data regarding the failures of operation of the set of devices within the network of devices, (iii) generating a network map of the network of devices comprised of pathways and alternate pathways, and (iv) adding a correction factor to the redundant devices along the alternate pathways recorded on the network map to mimic behavior of the devices that have experienced the failures of operation in order to maintain operation by the deployment.

Prior to obtaining the data regarding the failures of operation, the method may include (i) obtaining a set of devices that comprise a network of devices, (ii) obtaining a first device to store the failures of operations of the set of devices that comprise a network of devices; and (iii) deploy the set of devices and the first device that stores failures of operation of the set of devices.

Obtaining the data may include receiving, by the first device, a notice of failure of operation from a first member device within the set of devices within a network of devices, wherein the notice of failure indicates the first member device is failing to operate or will fail to operate in the future.

Obtaining the data may include receiving, by the first device, a notice of failure of operation from a second member device, wherein the notice of failure indicates that the second member device has observed that a first member device is failing to operate or will fail to operate in the future, wherein the first member device is unable to send the Storing the data may include cataloguing a list of devices within the set of devices within the network of devices to document notices of failures of operation for the devices that have been received by the first device, to obtain a catalogue of operational states of devices.

Generating the network map may include cataloguing, (i) identifying the redundant devices within the set of devices within the network of devices that generate first output similar to operational devices, and (ii) adding records to the network map, the records indicating operational pathways that intersect the redundant devices in the case that the operational devices experience failures of operation.

Identifying the redundant devices may include choosing devices within the set of devices within the network of devices that, upon application of the correction factor to the redundant devices, is configured to provide duplicative functionality for the operational devices.

Adding the correction factor may include (i) storing the first output from the redundant devices and the second output from the operational devices, (ii) training a machine learning model to learn differences between the first output from a redundant device and the second output from a failed device, (iii) obtaining a correction factor using the trained machine learning model, and (iv) applying the correction factor to the redundant device so that the first output from the redundant device matches the second output from the failed device.

Applying the correction factor may include modifying functionality of the redundant device to match the functionality of the failed device to facilitate the first output matching the second output.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system of FIG. 1 may include deployment 100. Deployment 100 may include Internet of Things (IoT) devices 100A-100N.

An IoT device may be a device that collects data about the outside world, processes it using logic or computation internal to the device, and sends the data through the Internet and/or a network to an end user or another device. Because IoT devices can record observable data from the outside world, process it, and send the data through a network, IoT devices may be usable for a variety of different uses.

IoT devices 100A-100N may include one or more sensors or other types of data collection devices (while described below with respect to sensors, it will be appreciated that any type of data collection device may be used). There may be no limit to the number of data collection devices and sensors that may be incorporated in an IoT device. As there may be no limit to the incorporation of data collection devices and sensors, IoT devices may not be limited in how much data collection may take place about the outside world. Therefore, the type and amount of data that may be collected by an IoT device may only be limited to the type and number of data collection devices and sensors that may be incorporated to an IoT device. With the increasing number and type of data collection devices and sensors that may be affixed to an IoT device, the amount and type of data that an IoT device may collect may increase as well.

IoT devices may include data processing tools for data that may be collected. Once data may be collected by one or more sensors that may be incorporated to an IoT device, one or more data processing tools may also be incorporated with an IoT device. With one or more data processing tools that may be incorporated with an IoT device, there may be no limit to the number and type of data processing tools that may be incorporated with an IoT device. As there may be no limit to the number and type of data processing tools that may be incorporated with an IoT device, there may be no limit to the quantity data and types of data that may be processed by an IoT device. With the increasing number of data processing tools that may be incorporated to an IoT device, the potential for data processing by an IoT device may increase as well.

Connection of an IoT device to the Internet and/or a network may augment ease of use for an end user as well. An IoT device may operate remotely with respect to an end user. In operating remotely with respect to an end user, an end user may not need to be in local proximity with an IoT device. An end user may not need to be in local proximity to an IoT device because the IoT device may be designed to operate independently of the end user. In operating independently of an end user, the IoT device may be designed with and execute logic that permits autonomous behavior. The logic that may permit autonomous behavior may permit utilization of any sensors or devices that may be affixed to the IoT device without end user intervention. The logic that may permit autonomous behavior may also extend to execution of data processing tools upon reception of data from the sensors or devices. Once the data processing tools complete processing of data from the sensors or devices, the IoT device may send the data to the end user through the Internet and/or a network. In sending and presenting data to an end user through the Internet and/or a network, the end user may not be required to be located proximate to the IoT device. In not being required to be located proximate to the IoT device, as long as the end user maintains a connection to the Internet and/or a network at their current location, the end user may be located anywhere. Therefore, on the condition than an end user may maintain a connection to the Internet and/or a network, an IoT device may augment ease of use for an end user.

As mentioned, an IoT device may incorporate logic that may permit autonomous behavior in processing data. In permitting autonomous behavior, an IoT device may not require intervention by an end user. An IoT device may not require intervention by an end user because it may be designed to record data from the outside world, process the data with any data processing tools that may be incorporated within the IoT device, and send the data through the Internet and/or a network. In being tasked with accomplishing these steps, it may be designed to accomplish these steps without human intervention. It may be designed to accomplish these steps without human intervention because an IoT device may be designed with logic that facilitates automation of these steps.

With these features of an IoT device, the applications for an IoT device may be many. The set of applications for which one or more IoT devices may facilitate services may include consumer, commercial, industrial, and infrastructure arenas.

IoT devices may have applications in the consumer arena. The consumer arena may include applications such as connected vehicles, home automation, wearable technology, connected health, and appliances. These applications may function with an IoT device with connection to the Internet and/or a network. Appliances within a home, for example, may be controlled or automated through a cellular phone that may be connected to a local area network. Assuming these appliances may also be connected to the local area network, the end user may execute tasks such as activating or deactivating one or more ceiling fans, ceiling lights, security cameras throughout the home. More interestingly, the end user may execute tasks such as activating or deactivating the air conditioner, television or any vehicles outside the home, and even opening or closing the garage door or any security gates on the property.

IoT devices may also have roles within the commercial arena. Concerning medical applications, IoT devices in this realm may be referred to as "Internet of Medical Things" (IoMT) devices. These devices may be worn by patients that collect data and send the data to medical professionals to make diagnoses and monitor patients. Such devices may include wearable heart monitors, blood pressure monitors, and glucose monitors. Not only may medical professionals utilize these devices to monitor patients, but guardians may be permitted to access end user data of a patient in order to aid care of the patient for which they may be responsible. Even while in proximity to the patient, guardians may receive data about the patient through their cellular phone to facilitate monitoring duties. Vehicles may be another commercial application for IoT devices. Such examples may include reception of traffic information and downloading of software updates for operating systems that drivers may use to interface with vehicle settings. Additionally, IoT devices in vehicles may govern other software that monitors for lane departure, driving speed, and braking behavior to qualify driving behavior. Further, vehicles requiring maintenance may be connected to a network at vehicle maintenance center. Using a network connection at a vehicle maintenance center, data from the vehicle may be uploaded to a remote network and be processed to determine parts of the vehicle that may need refinement or replacement.

IoT devices may have roles within the industrial arena. For example, IoT devices may be used for manufacturing applications. Examples of this may include monitoring of process control, operator tools, and service information systems to augment safety and security. IoT devices may be used to predict malfunctions by monitoring temperature, vibrations, voltage, and current in machinery. Further, IoT devices may be affixed to autonomous machinery to remove time-consuming and heavy human labor work. IoT devices may also be used in agriculture applications. Specifically in farming, IoT devices may be used to collect measurements of temperature, rainfall, humidity, wind speed, and soil content. IoT devices may use this data to automate autonomous farming machinery. Farmers may also utilize IoT devices to remotely monitor livestock, crops, and equipment. Data from monitoring may be used to forecast livestock behavior, crop yield, and equipment maintenance.

IoT devices may have roles within the infrastructure arena. Specifically in the infrastructure arena may be the advent of the smart city. Smart cities may use IoT devices that may be connected to a city-wide network to improve infrastructure, public utilities, and services. For example, IoT devices may be attached to buildings that track energy consumption. IoT devices may also be used in a city-wide network of sensors and cameras that monitor and collect data on weather, traffic, and pollution. Also, IoT devices may be used to collect data related to public transportation systems to optimize efficiency. Pollution may be monitored by IoT devices, to assess air quality of a city. Population density within a section of a city, specifically pedestrian traffic along sidewalks and vehicular traffic along roads and freeways, may also be measured using IoT devices, to assess which sections are more congested as various times within the day. The applications of IoT devices in the infrastructure arena may be still growing, especially toward the development of the smart city.

Within the numerous applications of IoT devices, despite the autonomous behavior of IoT devices, the IoT devices may be subject to failure in time. In time, with continued use of an IoT device, one or more IoT device that may be connected within deployment 100 may fail to function. In failing to function, one or more IoT devices may need refinement or replacement. Refinement or replacement may require human intervention. As refinement or replacement may require human intervention, the remote use of deployment 100 may break down. In the remote use of deployment 100 breaking down, human intervention, the role of which may be fulfilled by an end user or administrator, may require local activity by the end user or administrator. In requiring local activity by the end user of administrator, deployment 100 may not be employed over the Internet and/or a network, as described by communication system 104.

In general, embodiments disclosed here relate to systems and methods for improving the likelihood of successful completion of cooperative processes performed by multiple entities through application of a correction factor. To improve the likelihood of successful completion of cooperative process, the condition of the devices may be monitored to keep track of the operating states of the devices. When entities become unable to participate in the cooperative processes, the entities cooperatively performing the processes may be used in development of a machine learning model. The machine learning model may use the differences in output from a failed device and a redundant device to predict future differences between output of the redundant device and future output that the failed device would have generated had it not failed.

Development of the machine learning model may assist in the development of a correction factor. The correction factor may be used with output from the redundant device to synthesize output that would be generated with the failed device to allow continued performance of the cooperative process.

To provide the above noted functionality, the system may include deployment 100, which may include IoT device 100A-100N and failure aggregator 102. Also, the system may include communication system 104 and requesting device 106. Each of the components is discussed below.

To provide identification and either refinement and/or replacement of IoT device 100A-100N, failure aggregator 102 may be introduced within deployment 100. Failure aggregator 102 may serve to catalogue notices of failure of operation by IoT device 100A-100N. In addition to the presence of failure aggregator 102, logic within IoT device 100A-100N may be augmented to send notices of failure of operation by IoT device 100A-100N to failure aggregator 102. By cataloguing notices of failure of operation, failure aggregator 102 may serve to notify other devices within IoT device 100A-100N of proximal IoT devices that may fail to operate.

As an example, IoT device 100A may be connected to IoT device 100B, which may be connected to IoT device 100C. IoT device 100B may fail to operate but still be active. As a result of its failure, IoT device 100B may send notice of failure of operation to failure aggregator 102. At some point before or during operation of deployment 100, failure aggregator 102 may send the notice of failure of operation to IoT device 100A and IoT device 100C. In receiving notice of failure of operation concerning IoT device 100B, IoT device 100A and IoT device 100C may note that IoT device 100B may fail to operate. Further, as a failure to operate may exist for IoT device 100B, IoT device 100A and IoT device 100C may not execute operations along the pathway with IoT device 100B. Due to the failure to operate, IoT device 100B may execute operations on another set of IoT devices 100A-100N that do not include IoT device 100B. As a result of the failure to operate for IoT device 100B, failure aggregator 102 may also call for non-human remediation that may include running diagnostics or altering logic within IoT device 100B. Further, failure aggregator 102 may also call for replacement of IoT device 100B by non-human means, such as a utilization of a drone that might manually remove and affix a new IoT device 100B.

With the introduction and utilization of failure aggregator 102, deployment 100 may further remove the necessity of human intervention if one or more of IoT device 100A-100N may fail in deployment 100. In removing the necessity of human intervention in deployment 100, any human, be it as an end user or administrator, may be solely operate requesting device 106. Although requesting device 106 may be operated by an end user or administrator, requesting device 106 may also be a device that behaves autonomously. In either case, failure aggregator 102 may remove the possibility of human intervention operating in local proximity of deployment 100.

While some of IoT device 100A-100N may provide similar functionalities of other IoT devices such that they may be used to replace IoT devices in cooperative processes, some IoT devices may be sufficiently unique that no IoT device may serve as a replacement with its native functionality. To facilitate continued performance of cooperative processes when such unique IoT devices fail (and/or when non-unique devices fail but no redundant devices are available), the output of an imperfectly redundant IoT device (e.g., an IoT device that includes similar but not identical functionality) may be corrected using a correction factor to synthesize output of a failed IoT device. Thus, the output of the imperfectly redundant IoT device may used to continue performance of the cooperative process.

To obtain the correction factor, IoT device 100A-100N may include datasets which may include output resulting from operation of each of IoT device 100A-100N. Deployment 100 may include a machine learning model that may be capable of ingesting the multiple datasets and/or data derived from the data sets. Ingestion of the multiple datasets may enable the machine learning model to learn differences between the ingested datasets. These learned differences may enable generation of a correction factor which may be applied to any of IoT device 100A-100N to synthesize the output of a failed IoT device. The correction factor supplied by deployment 100 may aid in operations of any failed device of IoT device 100A-100N. Refer to FIGS. 2A-2F for additional details regarding the operation of failure aggregator 102 and IoT Devices 100A-100N.

Figure 3A:
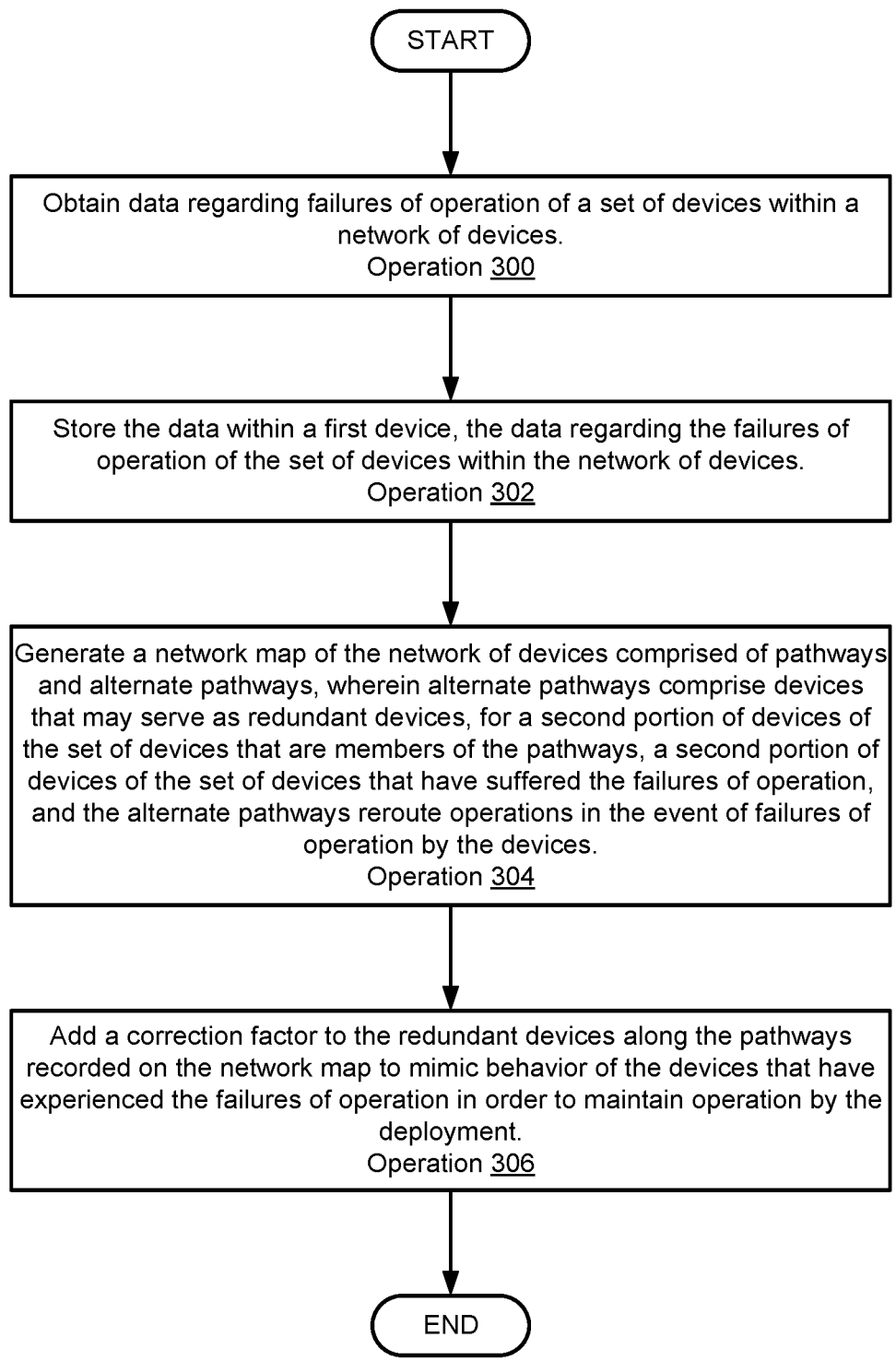
FIGS. 3A-3B show flow diagrams illustrating a method of managing operation of data processing systems in accordance with an embodiment.
Figure 3B:
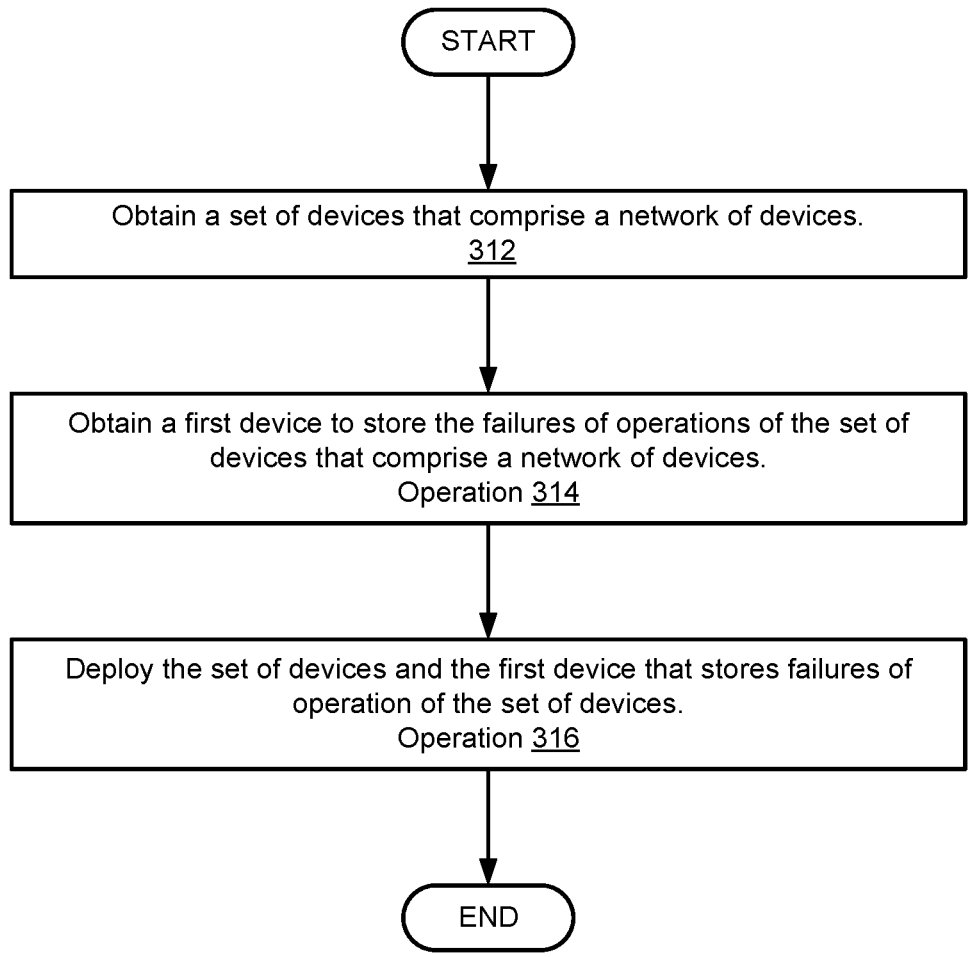

While providing their functionalities, any of IoT devices 100A-100N and/or failure aggregator may perform all, or a portion, of the methods shown in FIG. 3A-3B.

Thus, as identified in FIG. 1, a system in accordance with an embodiment may identify deployment 100 including IoT device 100A-100N and failure aggregator 102. Failure aggregator 102 may catalogue notices of failure of operation by IoT device 100A-100N. In cataloguing notices of failure of operation, deployment 100 may not execute any of pathways including IoT device 100A-100N that have failures of operation. Further, failure aggregator 102 may direct the refinement and/or replacement of any IoT device 100A-100N that fail to operate. In these ways, failure aggregator 102 may maintain the integrity of data transmission over communication system 104 and weaken the necessity of intervention of any entity, human or not, that may operate requesting device 106.

Any of (and/or components thereof) deployment 100, personal computing device 110, and/or deployment management service 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Figure 2B:
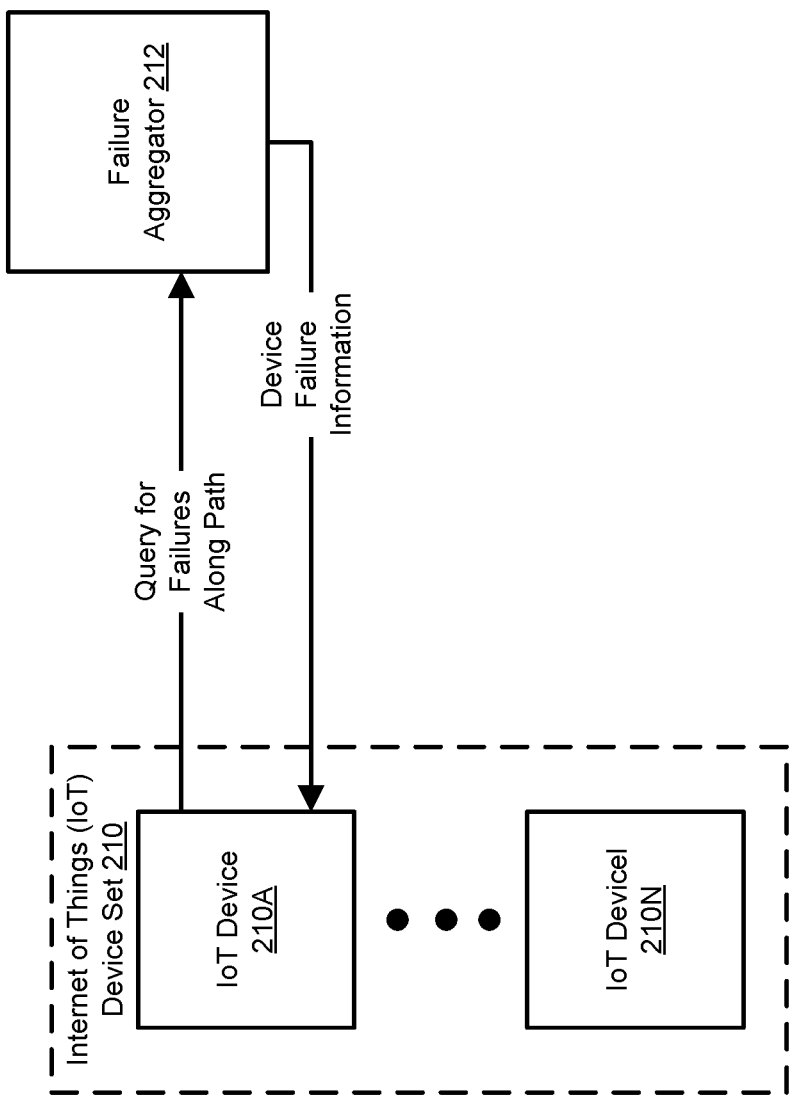
FIG. 2B shows a second data flow diagram illustrating operation of a portion of a system in accordance with an embodiment.
Figure 2C:
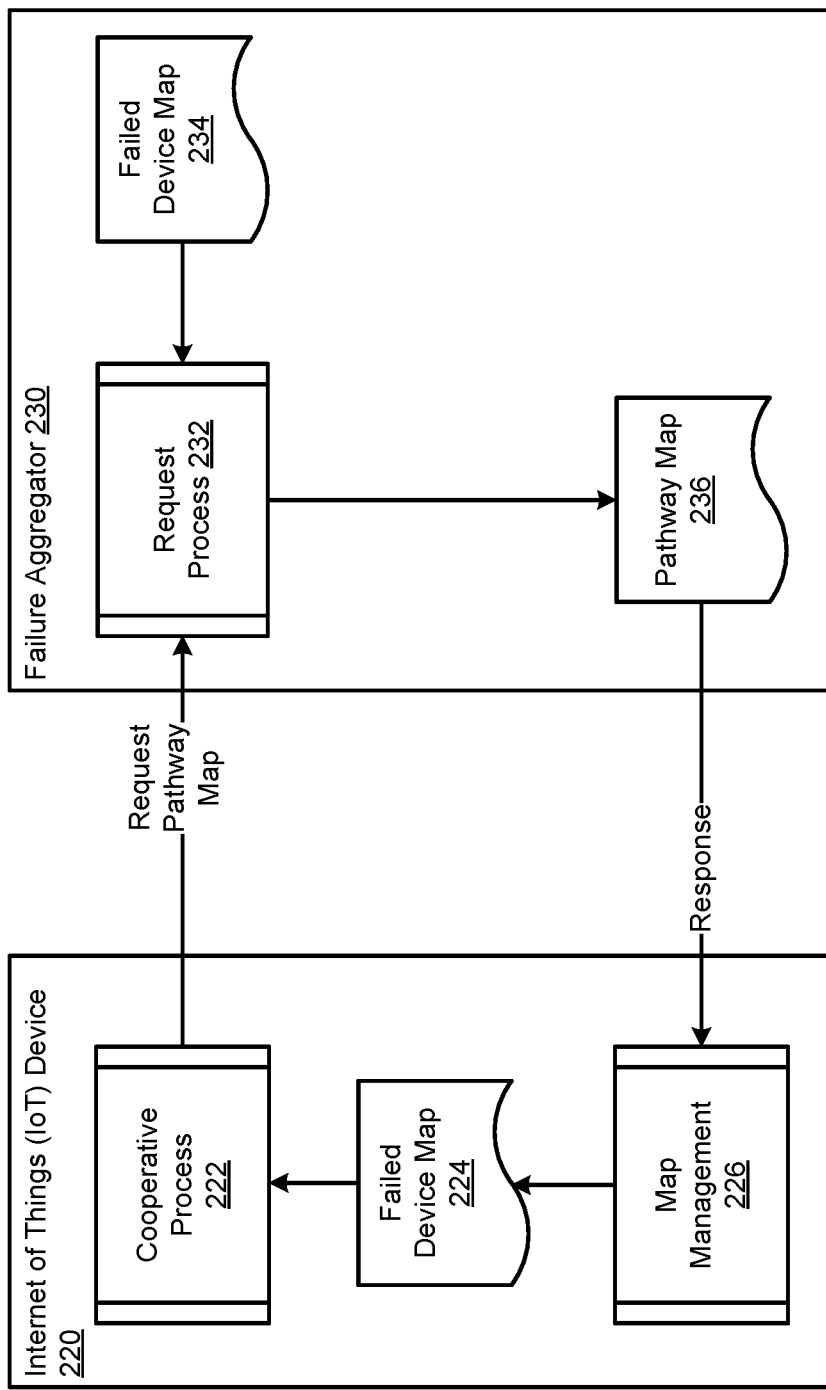
FIG. 2C shows a third data flow diagram illustrating operation of a portion of a system in accordance with an embodiment.
Figure 2D:
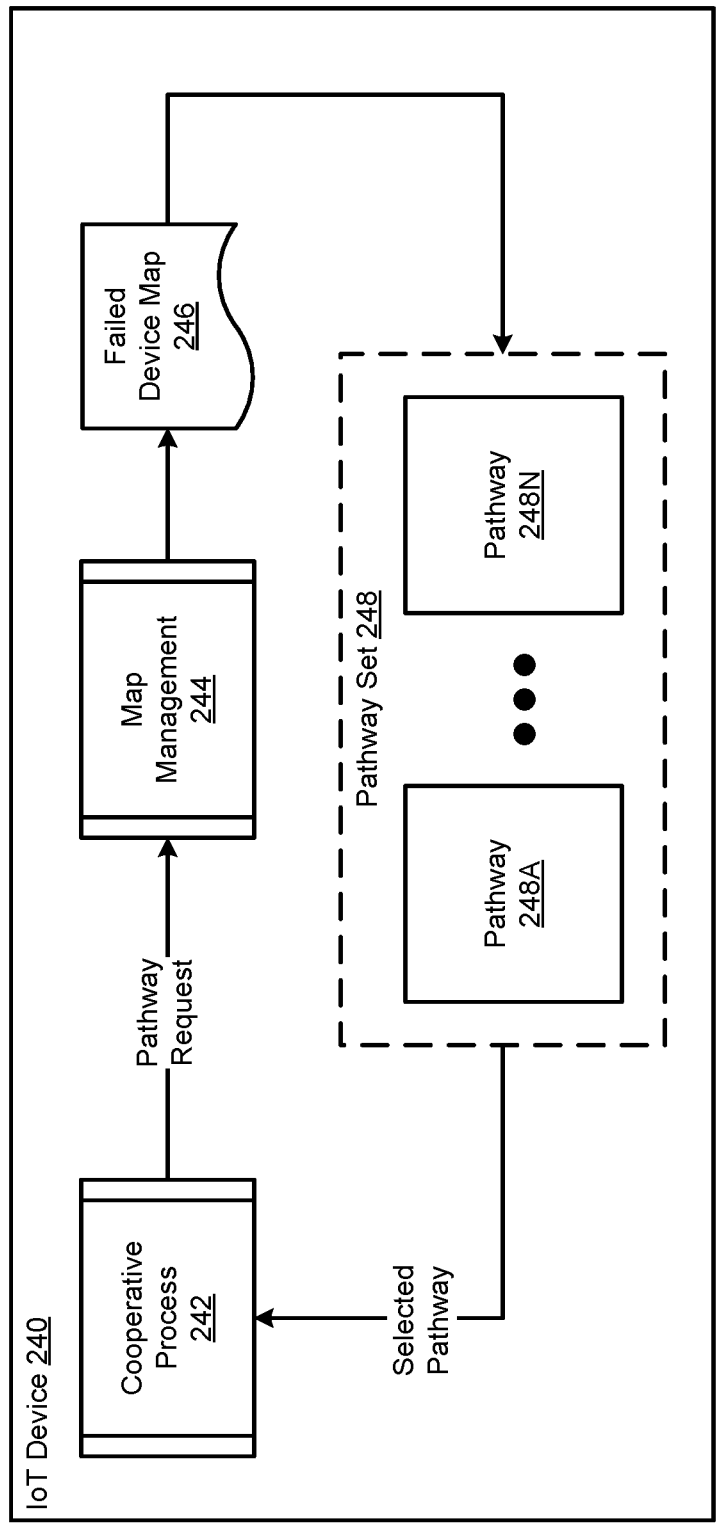
FIG. 2D shows a fourth data flow diagram illustrating operation of a portion of a system in accordance with an embodiment.
Figure 2E:
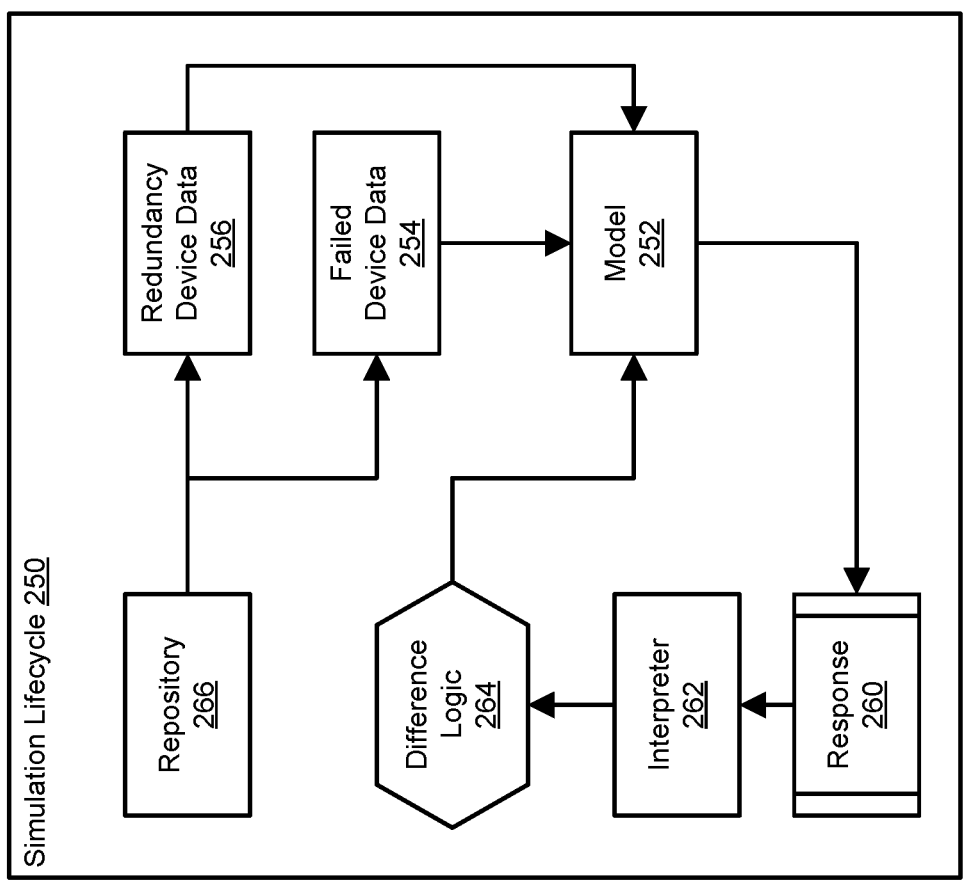
FIG. 2E shows a fifth data flow diagram illustrating operation of a portion of a system in accordance with an embodiment.
Figure 2F:
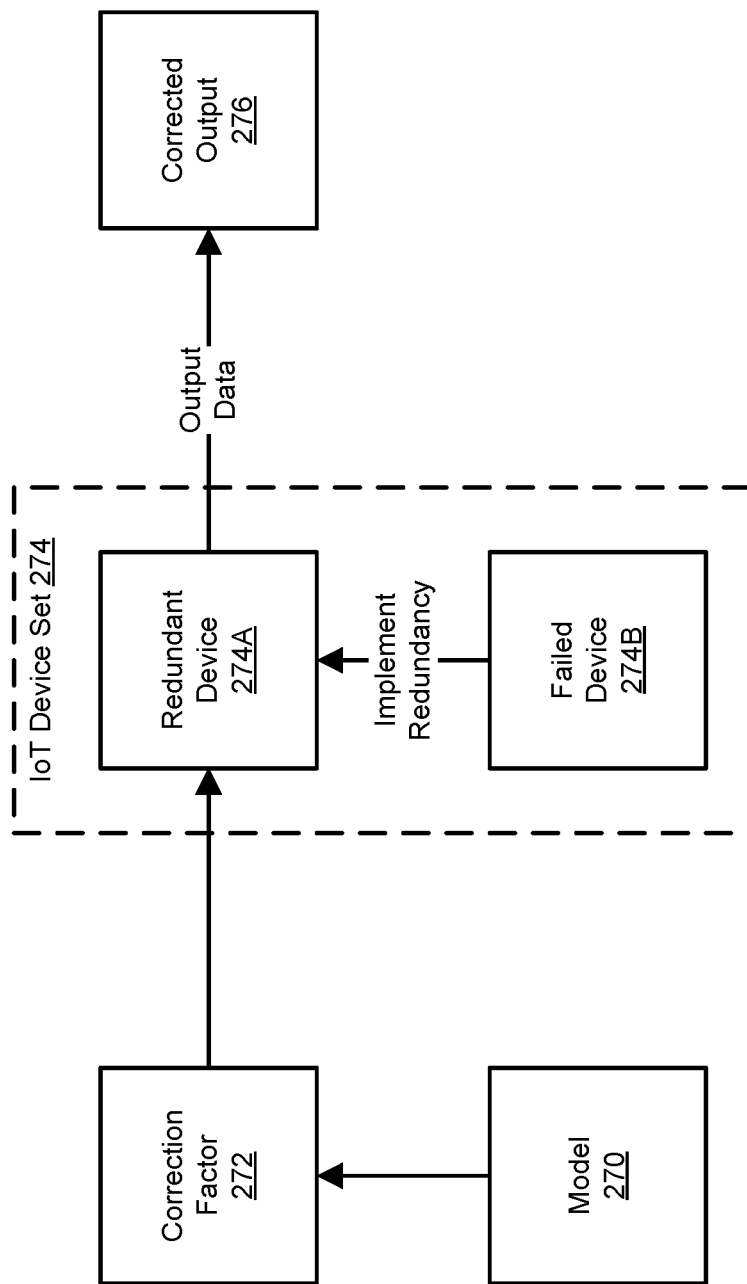
FIG. 2F shows a sixth data flow diagram illustrating operation of a portion of a system in accordance with an embodiment.

To further clarify embodiments disclosed herein, data flow diagrams are shown in FIG. 2A-2D. These data flow diagrams show flows of data that may be implemented by the system of FIG. 1. In FIG. 2A, the transfer of device failure information from failure aggregator 200 to IoT device set 202 is illustrated. In FIG. 2B, the transfer of device failure information is illustrated based on a query from IoT device 210A. In FIG. 2C, the transfer of device failure information may be further illustrated as a request for a pathway map from failure aggregator 230. In FIG. 2D, implementation of the pathway map and selection of a pathway in IoT device 240 is illustrated. In FIG. 2E, implementation of a simulation cycle of the development of a machine learning model is illustrated. In FIG. 2F, implementation of a correction factor is illustrated.

Turning to FIG. 2A, a data flow diagram illustrating transferring of device failure information in accordance with an embodiment is shown. When prompted by the deployment, similar to deployment 100 in FIG. 1, failure aggregator 200 may push a network map of functional devices that may include devices from IoT device 202A-202N. Functional devices may be expected to perform cooperative processes. A cooperative process may be a process in a set of devices that act in a cooperative manner along a pathway in the network map to perform a process. A pathway may link a set of devices along which information may be passed between devices through a cooperative process. All the pathways through which devices may perform cooperative process may be diagrammed by the pathway map, or network map. If received before or during operation of deployment 100, the network map may be used by IoT device 202A-202N that avoid devices that may be encumbered by failures of operation. In avoiding devices that may be encumbered by failures of operation, pathways may be selected that may comprise of IoT device 202A-202N that may not have failures of operation. In selecting pathways comprised of IoT device 202A-202N that may not have failures of operation, deployment 100 may operate overall without failure.

Failure aggregator 200 may implemented using functionality to catalogue information regarding notices of failure of operation. In cataloguing notices of failure of operation, failure aggregator 200 may use these notices to generate a network map of functional devices among IoT device 202A-202N. In generating a network map of functional devices, failure aggregator 200 may advise IoT device 202A-202N within the deployment to select a pathway on the network map that uses functional devices among IoT device 202A-202N. By advising IoT device 202A-202N within the deployment, failure aggregator 200 may maintain the fidelity of the deployment as it operates using IoT device 202A-202N.

As an example of the push function of failure aggregator 200, there may be a house equipped with a camera system. On every door and side of the house, there may be a camera. For each camera, there may be a device connected that provides notification to the end user if a human may be identified by the camera. Each camera may then be connected to a human identification device that may be connected to the wireless network in the house. Within the camera system, a set of pathways may exist in which photographic data may be generated by camera and may be passed to a human identification device, which may process the data and may pass it to the wireless network. Within each pathway, cooperative processes may be run between the camera, the human identification device, and the wireless network. Using the wireless network, the owner of the house may use their cellular phone, which may have software for the camera system, to receive notifications from and access the camera system. The camera system may include failure aggregator 200. It may be that however frequently per day, the end user has set failure aggregator 200 to push notification to each set of devices a network map of functional devices. The network map may use notices of failure from failure aggregator 200 to shut down a human identification device of camera.

IoT device set 202 may be implemented using a set of devices that may include IoT device 202A-202N. The set of devices may be connected in a linear or non-linear arrangement. In being connected, IoT device set 202 may be illustrated with a network map that may be generated by failure aggregator 200. The network map may relate connectivity of IoT device set 202. Therefore, the network map may illustrate all the pathways specific to IoT device set 202 along which cooperative processes may be performed.

IoT devices 202A-202N may be implemented using a set of devices of IoT device set 202. Each device within IoT devices 202A-202N may include (i) sensors that collect or measure observable information from the real-world and/or (ii) data processing tools that either processes data for use by another device or post-processes data in a human-readable format. In post-processing data in a human-readable format, the device may send the data through the Internet and/or a network, like communication system 104 in FIG. 1. In sending data through the Internet and/or the network, the data may be made available to a human-interfacing device, similar to requesting device 106 in FIG. 1.

Continuing with the example of the camera system, the camera system may have multiple pathways. Each pathway may include a camera somewhere on the outside of a house, followed by a human-identification device. For each pathway, each human-identification device may connect to the cellular phone of the owner of the house. Each human-identification device may include software that sends data over the wireless network in the house to the cellular phone of the owner of the house. In sending data to the cellular phone to the owner of the house, the data may be in a human-readable format that conveys confirmation that a human may be identified in the view of one or more cameras.

Thus, in FIG. 2A, a diagram illustrating the transfer of device failure information in accordance with an embodiment is shown. Failure aggregator 200 may push device failure information to each device within IoT device 202A-202N. In pushing device failure information, IoT device 202A-202N may operate using device pathways that may not include devices that may fail to operate.

In addition to pushing device failure information by the failure aggregator to the set of devices within a deployment, devices within a deployment may also query for device failure information from the failure aggregator. In querying for device failure information, a device may know whether other devices along a pathway may experience a failure to operate. In knowing whether other devices may experience a failure to operate, the device may determine whether performance of a cooperative process along the pathway may be possible.

Turning to FIG. 2B, a diagram illustrating querying for failures of operation along the path of IoT device 210A and subsequent transfer of device failure information in accordance with an embodiment is shown. During operation of the deployment which may include IoT device set 210, IoT device 210A may query for failures of operation along its path. In order to ascertain failures of operation along its path, IoT device 210A may query failure aggregator 212, which may be similar to failure aggregator 200 in FIG. 2A. As a result of the query by IoT device 210A, failure aggregator 212 may return device failure information to IoT device 210A. In the return, failure aggregator 212 may yield information of failures of operation along the path in which IoT device 210A operates. In ascertaining failures of operation along its path, IoT device 210A may utilize contingency logic if it becomes aware that subsequent devices along its path may fail to operate.

IoT device set 210 may be implemented using a set of devices that may include IoT device 202A-202N.

Using the example of the camera system from FIG. 2A, the camera system may have multiple pathways. Each pathway may include a camera somewhere on the outside of a house, followed by a human-identification device. For each pathway, each human-identification device may connect to the cellular phone of the owner of the house. Each human-identification device may include software that sends data over the wireless network in the house to the cellular phone of the owner of the house. A camera at some point may query failure aggregator 212 for failures of operation along the path, from the camera, through the human identification device, to the network. Failure aggregator 212 may return with a failure to operate from the human identification device along the same path. As a result of the failure to operate from the human identification device, the camera may run contingency logic. Contingency logic run by the camera may include shutting down the camera or sending an error message to the end user through another pathway from the camera to the network.

Failure aggregator 212 may be implemented using a device that catalogues information regarding notices of failure of operation. In cataloguing notices of failure of operation, failure aggregator 212 may use these notices to generate a network map of functional devices among IoT device 210A-210N. In generating a network map of functional devices, failure aggregator 212 may advise IoT device 210A-210N within the deployment to select a pathway on the network map that uses functional devices among IoT device 210A-210N. By advising IoT device 210A-210N within the deployment, failure aggregator 212 may maintain the fidelity of the deployment as it operates using IoT device 210A-210N.

Continuing with the example of the camera system of FIG. 2A, failure aggregator 212 may have received a notice of failure of operation from one of the human identification devices. Failure aggregator 212 may use this failure of operation to generate a network map of the camera system. Further, it may send this information as a network map to the devices within the camera system. The network map of the devices may be sent from the camera system using a push function, as described in FIG. 2A. In addition, upon reception of a query for failures from a device, failure aggregator 212 may send device failure information concerning the path on the network map on which the device operates.

Thus, as shown in FIG. 2B, a diagram illustrating a query for failures of operation along the path of IoT device 210A and subsequent transfer of device failure information in accordance with an embodiment is shown. IoT device 210A may query failure aggregator 212 for failures of operation of devices along its path. As a result, failure aggregator 212 may send device failure information of devices along the path of IoT device 210A from the network map. In reception of device failure information of devices along the path of IoT device 210A, IoT device 210A may operate with contingency logic to maintain operation of the deployment that utilizes IoT device set 210.

In requesting device failure information, a device may request a pathway map from the failure aggregator. The failure aggregator may respond accordingly so that the device may implement the pathway map for other cooperative processes in the deployment.

Turning to FIG. 2C, a data flow diagram illustrating a process for requesting for a pathway map in accordance with an embodiment is shown. IoT device 220 may include cooperative process 222 that may utilize incoming or outgoing data. In utilizing incoming or outgoing data, it may utilize data processing tools to perform tasks used in the function of IoT device 220.

Included in the performance of tasks, cooperative process 222 may initiate a request for the pathway map (the pathway map is discussed below in greater detail) of the deployment in which IoT device 220 may be implemented. To initiate a request for the pathway map, cooperative process 222 may send the request to request process 232 within failure aggregator 230. Request process 232 may receive the request. Request process 232 may note the sender of the request. In noting the signature of the request, request process 232 may query failed device map 234. In querying failed device map 234, request process 232 may retrieve all data of failed device map 234 pertinent to IoT device 220. In retrieving all data of failed device map 234 pertinent to IoT device 220, request process 232 may construct pathway map 236 that may include pathways relevant to IoT device 220. Relevant pathways for IoT device 220 may include all other devices with which IoT device 220 may perform cooperative processes. Pathway map 236 may illustrate all pathways through which IoT device 220 may be connected to other devices.

With pathway map 236 constructed, failure aggregator 230 may respond to IoT device 220 with pathways relevant to IoT device 220. Map management 226 in IoT device 220 may receive pathway map 236. In receiving pathway map 236, map management 226 may not only store pathway map 236, but it may also isolate failed device map 224 from pathway map 236. Failed device map 224 may be isolated from pathway map 236 by cataloguing pathways in which cooperative processes may not be run due to devices with a failure to operate. Through use of failed device map 224, IoT device 220 may learn which devices, along similar pathways as IoT device 220, may have failures of operation. In knowing which devices may have failures of operation, cooperative process 222 may know to not attempt execution of processes with known devices that may have failures of operation. In knowing devices that may have failures of operation, cooperative process 222 may redirect execution of processes to devices along connecting pathways that may not have failures of operation.

IoT device 220 may be implemented using a device, similar to any devices within IoT device 210A-210N included within IoT device set 210 in FIG. 2B.

Cooperative process 222 may be implemented using a process that implements logic using data that may be outgoing to and/or incoming from other IoT devices or failure aggregator 230. In processing outgoing and/or incoming data, cooperative process 222 may be involved in communication between other devices. In communicating with other devices, cooperative process 222 may be equipped to implement contingency logic when connected devices experience failures of operation.

Using the example of the camera system from FIG. 2A, cooperative process 222 may be implemented in all the devices of the camera system. In a camera, cooperative process 222 may process and send photographic data to a human-identification device. In a human-identification device, cooperative process 222 may receive photographic data, implement logic to discern human forms with photographic data, and may send those human forms in a human-readable format to the cellular phone of an end user. Further, cooperative process 222 may process connected pathways between devices within the camera system. In processing pathways within the camera system, it may implement logic to request a pathway map from failure aggregator 230. In requesting a pathway map from failure aggregator 230, cooperative process 222 may query request process 232.

Failure aggregator 230 may be implemented using a device that catalogues information regarding notices of failure of operation. In cataloguing notices of failure of operation, failure aggregator 230 may use these notices to generate a network map of functional devices among IoT device 210A-210N from FIG. 2B and IoT device 220. In generating a network map of functional devices, failure aggregator 230 may advise IoT device 210A-210N from FIG. 2B and IoT device 220 within the deployment to select a pathway on the network map that uses functional devices among IoT device 210A-210N from FIG. 2B and IoT device 220. By advising the IoT device 210A-210N from FIG. 2B and IoT device 220 within the deployment, failure aggregator 230 may maintain the fidelity of the deployment as it operates using IoT device 210A-210N from FIG. 2B and IoT device 220.

Request process 232 may be implemented using a process that may receive queries for pathway maps from devices in the deployment. In receiving queries for pathway maps, request process 232 may be equipped to identify the sender of the request. Using identification of the sender, request process 232 may call failed device map 234, which may entail all devices having failures of operation that may share pathways with IoT device 220.

Continuing with the example of the camera system, request process 232 may have received a request for pathway map from cooperative process 222 within IoT device 220, which may be either from a camera or human identification device. Whichever type of device, camera or human identification device, may have sent the query, request process 232 may retrieve failed device map 234 from its catalogue of failed devices. The catalogue of failed devices may include connected cameras or human identification devices. Using the catalogue of failed devices, from which failed device map 234 may be constructed, request process 232 may construct pathway map 236.

Failed device map 234 may be implemented using a data structure which catalogues information on devices that fail to operate. In cataloguing information on devices that fail to operate, failed device map 234 may be hosted by a device, including failure aggregator 230. In being hosted by failure aggregator 230, a query may be sent to failure aggregator 230 to request information on devices that fail to operate.

Continuing with the example of the camera system, request process 232 may have received a request for pathway map from cooperative process 222 within IoT device 220. To fulfill this request, request process may retrieve failed device map 234, which may include catalogued information on devices connected to IoT device 220 that may fail to operate. The catalogued information from failed device map 234 may be used to generate pathway map 236.

Pathway map 236 may be implemented using a data structure which illustrated the pathways relevant to IoT device 220 that may not fail to operate. In illustrating pathways that may not fail to operate, pathway map 236 may be used to direct a device by illustrating functional pathways on which to execute operations. In illustrating functional pathways on which to execute operations, pathway map 236 may be utilized by IoT device 220 specifically with map management 226.

Continuing with the example of the camera system, request process 232 may have received a request for pathway map from cooperative process 222 within IoT device 220. Request process 232 may utilize failed device map 234 to construct pathway map 236. With pathway map 236, failure aggregator 230 may generated all functional pathways applicable in the camera system specifically for IoT device 220.

Map management 226 may be implemented using a process which may ingest pathway map 236. Through ingestion of pathway map 236, map management 226 may have the functionality to process all functional pathways applicable to IoT device 220. In being able to process all functional pathways applicable to IoT device 220, map management 226 may be tasked with directing cooperative process 222 by isolating IoT devices along similar pathways to IoT devices 220 that may fail to operate.

Continuing with the example of the camera system, IoT device 220 may have received pathway map 236 from failure aggregator 230. In receiving pathway map 236, map management 226 may have ingested pathway map 236. Either device type, be it a camera or human identification device, may include map management 226 within its functionality. Map management 226 may utilize pathway map 236 to generate failed device map 224. Failed device map 224 may include a catalogue of all devices within the camera system along similar pathways as IoT device 220 that may have failure of operation.

Failed device map 224 may be implemented using a data structure which catalogues information on devices that fail to operate. Failed device map 224 may be similar to failed device map 234. In cataloguing information on devices that fail to operate, failed device map 224 may be housed within a device, including failure aggregator 230. In being housed within any device, failed device map 224 may be used to direct cooperative process 222 by regulating to which devices with which not to expect functionality, to which not to expect incoming data and to which not to send outgoing data.

Continuing with the example of the camera system, failed device map 224 may include a catalogue of all devices that may have failures of operation within the camera system. Cooperative process 222 may ingest failed device map 224, thereby allowing failed device map 224 to direct its processes. Failed device map 224 may direct cooperative process 222 to not work with or expect incoming or outgoing data from cameras or human identification devices which may have failures of operation.

Thus, in FIG. 2C, a diagram illustrating a request for a pathway map in accordance with an embodiment is shown. Cooperative process 222 from IoT device 220 may request the pathway map. Failure aggregator 230 may generate pathway map 236 from failed device map 234, which may be a catalogue of devices which may have failures of operation. Pathway map 236 may be passed to map management 226 in IoT device 220. Map management 226 may generate failed device map 224, which may be a catalogue of devices which may have failures of operation. Failed device map 224 may be used to direct processes on cooperative process 222.

Turning to FIG. 2D, a data flow diagram illustrating selection of a pathway in IoT device 240 in accordance with an embodiment is shown. The pathway may be selected based on information obtained through the flows shown in FIGS. 2B and/or 2C, and to ensure successful completion of cooperative process 242 even when some devices of a deployment that may otherwise participate in cooperative process 242 have failed. Cooperative process 242 may cause IoT device 240 to perform one or more actions cooperatively with other devices to complete a cooperative process. The one or more actions may include sending data to other devices and obtaining data from other devices. The other devices may be selected on the basis of a selected pathway. Cooperative process 242 may involve selection of a pathway on which no connected devices have failures of operation. In selecting a pathway on which no devices have failures of operation, cooperative process 242 may utilize a pathway. In utilizing a pathway, map management 244 may recall failed device map 246. In recalling failed device map 246, map management 244 may begin with a catalogued information of devices that may fail to operate. FIG. 2C may illustrate ingestion of failed device map 224 by cooperative process 222. As failed device map 224 from FIG. 2C may be similar to failed device map 246 in FIG. 2D, and as cooperative process 222 from FIG. 2C may be similar to cooperative process 242, it may be expected that failed device map 246 may be ingested by cooperative process 242. However, cooperative process 242 may utilize failed device map 246 to generate pathway set 248, which includes all the possible pathways, pathway 248A-248N, connected through cooperative process 242. From pathway 248A-248N, cooperative process 242 may require an appropriate pathway, pathway 248A, through which to accept incoming data, process it, and send as outgoing data.

IoT device 240 may be implemented using a device, similar to IoT device set 220 in FIG. 2C. Internet and/or a network Cooperative process 222 may be implemented using a process that implements logic using data that may be outgoing or incoming from other IoT devices or failure aggregator 230 in FIG. 2C. In processing outgoing or incoming data, cooperative process 222 may be involved in communication between other devices. In communicating with other devices, cooperative process 222 may be equipped to implement contingency logic when connected devices experience failures of operation.

Using the example of the camera system from FIG. 2A, cooperative process 242 may be implemented in all the devices of the camera system. In a camera, cooperative process 242 may process and send photographic data to a human-identification device. In a human-identification device, cooperative process 242 may receive photographic data, implement logic to discern human forms with photographic data, and/or may send those human forms in a human-readable format to the cellular phone of an end user. Further, cooperative process 242 may process connected pathways between devices within the camera system. In processing pathways within the camera system, it may implement logic to request a pathway from map management 244.

Map management 244 may be implemented using a process which may ingest pathway map 236 from FIG. 2C. Through ingestion of pathway map 236, map management 244 may have the functionality to process all functional pathways applicable to IoT device 240. In being able to process all functional pathways applicable to IoT device 240, map management 244 may be tasked with directing cooperative process 242 by isolating IoT devices along similar pathways to IoT devices 240 that may fail to operate, as illustrated in FIG. 2C. Map management 244 may also store and recall failed device map 246 as directed by cooperative process 242, as illustrated in FIG. 2D.

Continuing with the example of the camera system from FIG. 2A, cooperative process 242 may have requested a pathway along which data may be processed and for operations to proceed. The request for the pathway may have been received by map management 244. In reception of the request of a pathway, map management 244 may recall failed device map 246.

Failed device map 246 may be implemented using a data structure which catalogues information on devices that fail to operate. Failed device map 246 may be similar to failed device map 224. In cataloguing information on devices that fail to operate, failed device map 246 may be housed within a device, including IoT device 240. In being housed within any device, failed device map 246 may be used to direct cooperative process 222 by regulating to which devices with which not to expect functionality, to which not to expect incoming data and to which not to send outgoing data. Failed device map 246 may also be recalled from map management 244 for the development of pathway set 248 to aid in the regulation of cooperative process 242.

Continuing with the example of the camera system from FIG. 2A, cooperative process 242 may have requested a pathway along which data may be processed and for operations to proceed. Failed device map 246 may have been recalled from storage on map management 244. In being recalled from storage, failed device map 246 may be ingested by cooperative process 242, which may develop pathway set 248 from failed device map 246. In developing pathway set 248, cooperative process 242 may select pathway 248A from pathway set 248 along which operations of cooperative process 242 may proceed.

Pathway set 248 may be implemented using a set of pathways. The set of pathways may be generated from failed device map 246. In generating pathways from failed device map 246, pathway set 248 may not be comprised of devices that have failures of operation.

Pathway 248A-248N may comprise the set of pathways from pathway set 248. In comprising the set of pathways from pathway set 248, pathway 248A-248N may not be comprised of devices that have failures of operation. In not being comprised of devices that have failures of operation, pathway 248A-248N may utilize devices that promote operation and processing of data by cooperative process 242.

Continuing with the example of the camera system from FIG. 2A, cooperative process 242 may have requested a pathway along which data may be processed for operations to proceed. Using failed device map 246, cooperative process 242 may have generated pathway set 248. From pathway set 248, cooperative process 242 may choose an optimal pathway, pathway 248A, along which to process and send outgoing photographic data. For the camera system, a camera may choose pathway 248A that bypasses human identification devices that have failures of operation. If all human identification devices in the camera system have failures of operation, then pathway 248A may entail sending raw photographic data or an error message directly to the cellular phone of an end user.

Thus, as shown in FIG. 2D, a diagram illustrating selection of a pathway in IoT device 240 in accordance with an embodiment is shown. Cooperative process 242 may request a pathway from map management 244. As a result, map management 244 may recall failed device map 246 from storage. Pathway set 248 may be generated from failed device map 246 by cooperative process 242. From pathway set 248, the optimal pathway, pathway 248A, may be selected by cooperative process 242 along which to process data and proceed with operations.

As an alternative to bypassing a failed device with a failure of operation by pathway selection, a machine learning model may be developed. The machine learning model may be developed to learn the differences between the failed device and a redundant device that may exist within the deployment.

Turning to FIG. 2E, a diagram illustrating simulation lifecycle 250 in accordance with an embodiment is shown. In simulation lifecycle 250, model 252 may be developed. In development of model 252, redundancy device data 256 and failed device data 254 may be taken from repository 266. Taken from repository 266, failed device data 254 and redundancy device data 256 may be absorbed by model 252. Failed device data 254 may be data taken from a device that may have been previously operational but may currently have a failure to operate. Additionally, redundancy device data 256 may be data taken from a device that may be currently operational and may operate similarly but not exactly as the failed device.

Upon absorbing failed device data 254 and redundancy device data 256, model 252 may give response 260. Response 260 may include differences in the data between failed device data 254 and redundancy device data 256. The differences in the data may be absorbed by interpreter 262. Interpreter 262 may generate difference logic 264. Difference logic 264 may include programmatic logic that may be necessary to add to the device from which redundancy device data 256 originated match failed device data 254 from the failed device.

Difference logic 264 may be absorbed by model 252. In absorbing difference logic 264, model 252 may begin to learn what logic may be required by the redundant device that produced redundancy device data 256 to produce failed device data 254.

To train model 252, simulation lifecycle 250 may be iterated through numerous cycles. In iterating simulation lifecycle 250 through numerous cycles, model 252 may continue to absorb failed device data 254 and redundancy device data 256, both of which may be called from repository 266. In more cycles of absorbing failed device data 254 and redundancy device data 256, difference logic 264 may continue to develop. In developing difference logic 264, model 252 may learn from development of difference logic 264. In learning development of difference logic 264, model 252 may be trained to develop programmatic logic for all variations of differences between failed device data 254 and redundancy device data 256. In developing programmatic logic for all variations of differences, model 252 may sufficiently modify redundant device, the source of redundancy device data 256, so that the redundant device may be able to produce failed device data 254.

Simulation lifecycle 250 may be a process which may govern the development of model 252. In governing the development of model 252, simulation lifecycle 250 may include configuration settings of the machine learning process. Configuration setting of the machine learning process may include the split ratio for training and testing with data, learning rate, optimization algorithm, loss function, and the number of epochs.

Model 252 may be implemented using an inference model. An inference model may be implemented using a machine learning model, a decision tree, naïve bayes model, linear or logistic regression model, kNN model, k-means model, random forest model, and/or support vector machines model.

The machine learning model may be a neural network. The neural network may be trained using supervised learning, unsupervised learning, semi-supervised learning, or reinforcement learning. The learning process for model 252 may entail development of programmatic logic based on input of two different qualities of data sets.

Continuing with the example of the camera system from FIG. 2A, it may pass that a camera may be connected to a human identification device. It may also pass that a generic identification device may be operationally connected to the camera. This generic identification device may be similar to the human identification device in that it may be configured to recognize moving entities in photographic data from the camera. However, the generic identification device may not be configured to identify humans. To serve as a redundant device in case of a failure to operate by the human identification device, the generic identification device may need to be trained for human identification. Model 252 may be trained using data generated from the human identification device and from the generic identification device.

Repository 266 may be implemented using one or more data structures. The data structure may contain one or more volumes of data for redundancy device data 256 and failed device data 254. Redundancy device data 256 and failed device data 254 may be formatted specifically for input into model 252.

Continuing with the example of the camera system from FIG. 2A, repository 266 may contain output data for the set of cameras and human identification devices in the camera system. The output data, redundancy device data 256 and failed device data 254, may have been generated at manufacture or setup of the camera system. Upon failure of operation by a device, this redundancy device data 256 and failed device data 254 may be utilized in training model 252.

Failed device data 254 may be implemented as a data structure that may include data from a device that may be expected to experience a failure to operate. In anticipation for a failure to operate, failed device data 254 may be generated. With generation of failed device data 254, data from the failed device, rather than the failed device itself, may be utilized to train model 252.

Continuing with the example of the camera system from FIG. 2A, a generic identification device may have been installed to serve as a redundancy for a human identification device. In addition, a data set may have been generated with the human identification device and stored within the deployment. The data set may serve as failed device data 254. Failed device data 254 may be called from storage and used in training model 252. In addition, model 252 may also require a data set, redundancy device data 256, that may have been generated with the generic identification device and stored within the development.

Redundancy device data 256 may be implemented as a data structure that may include data from another device. This device may serve as a redundancy for a device that may experience a failure to operate. In anticipation for training model 252, redundancy device data 256 may be generated. With generation of redundancy device data 256, data from the redundant device, rather than the redundant device itself, may be utilized to train model 252.

Continuing with the example of the camera system from FIG. 2A, a generic identification device may have been installed to serve as a redundancy for a human identification device. The human identification device may experience a failure to operate, and thus may be inoperable. Despite the inoperability of the human identification device, failed device data 254 may be called from storage. Also, redundancy device data 256 may also be called from storage. Having called both data sets from storage, model 252 may begin training by assessing the differences in both data sets.

Response 260 may be implemented using one or more data structures which note the differences in failed device data 254 and redundancy device data 256. In noting the differences in both data sets, model 252 may distinguish between both data sets.

Continuing with the example of the camera system from FIG. 2A, failed device data 254 from the human identification device and redundancy device data 256 from the generic identification device may be digested by model 252. In digesting both data sets, model 252 may observe differences between both data sets. Using the differences, interpreter 262 may seek to understand the differences in both data sets.

Interpreter 262 may be implemented using one or more processes which digest response 260. In digesting response 260, interpreter 262 may seek to understand the programmatic logic which may yield response 260. In seeking to understand the programmatic logic, interpreter 262 may develop difference logic 264, which may be the source of differences between both data sets.

Continuing with the example of the camera system from FIG. 2A, interpreter 262 may read the differences in data sets from the human identification device and generic identification device. In reading the differences in data sets, interpreter 262 may develop the programmatic logic that may govern the differences in data sets. The programmatic logic that may govern the differences in data sets may be difference logic 264.

Difference logic 264 may be implemented using one or more data structures which note the source of differences between failed device data 254 and redundancy device data 256. The source of differences may include programmatic logic from which model 252 may absorb in its training in simulation lifecycle 250. In absorbing difference logic 264, model 252 may begin to learn what programmatic logic governs the differences in failed device data 254 and redundancy device data 256.

Continuing with the example of the camera system from FIG. 2A, interpreter 262 may yield difference logic 264. Difference logic 264 may include programmatic logic which governs the differences in data sets from the human identification device and the generic identification device. Difference logic 264 may be passed to model 252, which may begin to learn how to develop programmatic logic to replace the human identification device with the generic identification device. In replacing the human identification device, model 252 may be trained to correct the generic identification device to behave exactly like the human identification device.

Thus, as shown in FIG. 2E, a diagram illustrating simulation lifecycle 250 in accordance with an embodiment is shown. Simulation lifecycle 250 may govern training of model 252. Model 252 may be trained to correct the function of a redundant device so that it may behave exactly like a failed device. Model 252 may be trained by learning the differences in data from both devices. In learning the differences in data from both devices, model 252 may learn the difference in programmatic logic between both devices. In learning the difference in programmatic logic, model 252 may provide corrective logic to the redundant device to make it behave exactly as the failed device.

The machine learning model that may have been developed using the failed device and the redundant device may be used to correct for output from the failed device. The machine learning model may be correct for output from the failed device by applying a correction factor to the output of the failed device. Application of the correction factor may yield corrected output from the failed device.

Turning to FIG. 2F, a diagram illustrating implementation of a correction factor in accordance with an embodiment is shown. Model 270 may have been trained, as shown in FIG. 2E, using data from failed device 274B and redundant device 274A. After having been trained with both data sets, model 270 may generate correction factor 272. Model 270 may generate correction factor 272 to be applied to redundant device 274A upon implementation of redundant device 274A in place of failed device 274B. Upon implementation, redundant device 274A may execute functionality in place of failed device 274B. Correction factor 272 may be applied to redundant device 274A while in place of failed device 274B so that redundant device 274A may produce corrected output 276. Corrected output 276 may be output from redundant device 274A that would be similar output from failed device 274B, if failed device 274B may not have experienced a failure to operate.

Model 270 may be implemented using an inference model. An inference model may be implemented using a machine learning model, a decision tree, naïve bayes model, linear or logistic regression model, kNN model, k-means model, random forest model, and/or support vector machines model.

The machine learning model may be a neural network. The neural network may be trained using supervised learning, unsupervised learning, semi-supervised learning, or reinforcement learning. The learning process for model 270 may entail development of programmatic logic based on input of two different qualities of data sets.

Continuing with the example of the camera system from FIG. 2A, it may pass that a camera may be connected to a human identification device. It may also pass that a generic identification device may be operationally connected to the camera. This generic identification device may be similar to the human identification device in that it may be configured to recognize moving entities in photographic data from the camera. However, the generic identification device may not be configured to identify humans. To serve as a redundant device in case of a failure to operate by the human identification device, the generic identification device may need to be trained for human identification. Model 252 may be trained using data generated from the human identification device and from the generic identification device.

Correction factor 272 may be implemented as a data structure that may have been generated by model 270. Generation of correction factor 272 by model 270 may have been initiated using data sets from redundant device 274A and failed device 274B. Through use of data sets from redundant device 274A and failed device 274B, correction factor 272 may be applied to redundant device 274A to correct functionality so that output from redundant device 274A may match output from failed device 274B.

Continuing with the example of the camera system from FIG. 2A, model 252 may have been trained using data generated from the human identification device and from the generic identification device. The human identification device may have experienced a failure of operation and the generic identification device may have been implemented as a redundant device. To implement the generic identification device in place of the human identification device and produce data as might be expected from the human identification device, correction factor 272 may be applied to the generic identification device.

IoT device set 274 may include the set of devices in consideration. The set of devices in consideration may include redundant device 274A and failed device 274B. Given correction factor 272, redundant device 274A may be implemented in place of failed device 24B.

Failed device 274B may be implemented as a device which may experience a failure to operate. In experiencing a failure to operate, failed device 274B may require replacement. To suffice for a replacement, redundant device 274A may be considered.

Continuing with the example of the camera system from FIG. 2A, the human identification device may have experienced a failure to operate. In experiencing a failure to operate, the human identification device may require replacement. To suffice for a replacement, the generic identification device may be considered.

Redundant device 274A may be implemented as a device to replace failed device 274B. To replace failed device 274B, redundant device 274A may require correction to its functionality. To correct for functionality of redundant device A, correction factor 272 may be applied.

Continuing with the example of the camera system from FIG. 2A, the generic identification device may be considered as a replacement for the human identification device. To replace the human identification device, the generic identification device may require correction to its functionality. To correct for functionality of the generic identification device, correction factor 272 may be applied.

Corrected output 276 may be implemented as a data structure that included the output of redundant device 274A. The output of redundant device 274A may match output that failed device 274B may output if failed device 274B may not experience a failure to operate. Because failed device 274B may experience a failure to operate, redundant device 274B may become responsible for outputting data as corrected output 276.

Continuing with the example of the camera system from FIG. 2A, the generic identification device may replace the human identification device. In replacing the human identification device, the generic identification device may output data that may match the human identification device. By producing data that may match that from the human identification device, the generic identification device may output corrected output 276.

Thus, as shown in FIG. 2F, a diagram illustrating implementation of correction factor 272 in accordance with an embodiment is shown. Implementation of correction factor with redundant device 274A may result in corrected output 276. In generating corrected output 276, redundant device 274A may output data that matches output from failed device 274B when it may not experience a failure to operate.

As discussed above, the components of FIG. 1 may perform various methods to provide services using cooperative processes. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

As discussed above, the components of FIG. 1 may perform various methods to manage operations of a set of devices within a network of devices. FIGS. 3A-3B illustrate methods that may be performed by the components of FIG. 1.

Prior to the operations in FIG. 3A, the operations of FIG. 3B may be performed.

Turning to FIG. 3A, a flow diagram illustrating management of the failures of operations of a set of devices within a network of devices is shown. The operation may be performed, for example, by a public or private data system, or through a cloud service.

At operation 300, data may be obtained regarding failures of operation of a set of devices within a network of devices. The data may be obtained by receiving, by the first device, a notice of failure of operation from a first member device within the set of devices within a network of devices, wherein the notice of failure indicates the first member device is failing to operate or will fail to operate in a future point in time. A notice of failure of operation may be received by transmitting notification of the failure of operation from the first member device to the first device. The data may also be obtained by receiving, by the first device, a notice of failure of operation from a second member device, wherein the notice of failure indicates that the second member device has observed that a first member device is failing to operate or will fail to operate in a future point in time, wherein the first member device is unable to send the notice of failure of operation, wherein the second member device is within a set of devices within a network of devices. A notice of failure of operation may be received by transmitting notification of the failure of operation from the second member device to the first device.

At operation 302, the data may be stored within a first device, and the data may regard the failures of operation of the set of devices within the network of devices. The data may be stored by cataloguing a list of devices within the set of devices within the network of devices to document notices of failures of operation for the devices that have been received by the first device, to obtain a catalogue of operational states of devices. A list of devices within the set of devices within the network of devices may be catalogued by storing the identifies of the list of devices in the first device.

At operation 304, a network map of the network of devices may be generated using the data, the network map comprising pathways and alternate pathways, the alternate pathways comprising a first portion of devices of the set of devices that serve as redundant devices for a second portion of devices of the set of devices that are members of the pathways, a second portion of devices of the set of devices that have suffered the failures of operation, and the alternate pathways being usable to continue operation of the set of devices while the failures of operation of the set of devices are present. The network map of the network of devices may be generated by (i) identifying the redundant devices within the set of devices within the network of devices that generate first output similar to operational devices, wherein the first output from the redundant devices may not match second output from the operational devices, and (ii) adding records to the network map, the records indicating operational pathways that intersect the redundant devices in a case that the operational devices experience failures of operation. The redundant devices within the set of devices within the network of devices may be identified by choosing devices within the set of devices within the network of devices that, upon application of the correction factor to the redundant devices, is configured to provide duplicative functionality for the operational devices. The devices within the set of devices within the network of devices may be chosen by selecting the devices that may contain similar functionality and/or processing. The records may be added to the network map by sending notification to the first device to add records to the network map.

At operation 306, a correction factor may be added to the redundant devices along the alternate pathways recorded on the network map. A correction factor may be added by (i) storing the first output from the redundant devices and the second output from the operational devices, (ii) training a machine learning model to learn differences between the first output from a redundant device and the second output from a failed device, wherein the failed device is one of the set of operational devices that has a failure of operation, wherein the redundant device is one of the set of the redundant devices; (iii) obtaining a correction factor using the trained machine learning model, and (iv) applying the correction factor to the redundant device so that the first output from the redundant device matches the second output from the failed device, wherein the second output from the failed device was generated when the failed device was the operational device. First output from the redundant devices and second output from the operational devices may be stored by adding the first output and the second output to a repository. The machine learning model may be trained by calling the first output and the second output from the repository and learning the differences between the first output and the second output. The correction factor may be obtained by successfully training the machine learning model to understand functional differences between the first output and the second output. The correction factor may be applied by modifying functionality of the redundant device to match the functionality of a failed device to facilitate the first output matching the second output. The functionality of the redundant device may be modified to match the functionality of the failed device by altering the programming of the redundant device so that the first output may match the second output.

The method may end following operation 306.

Turning to FIG. 3B, a flow diagram illustrating the construction of deployment is shown.

At operation 312, a set of devices may be obtained that comprise a network of devices. A set of devices may be obtained by purchasing the devices from a vendor or transferring devices from another deployment.

At operation 314, a first device may be obtained to store the failures of operation of the set of devices that comprise a network of devices. A first device may be obtained by purchasing the first device from a vendor or transferring the first device from another deployment.

At operation 316, the set of devices and the first device may be deployed that stores failures of operation of set of devices. The set of devices and the first device may be deployed by initiating operation of the first device and implementing the deployment that comprises the set of devices and the first device.

The method may end following operation 316.

Figure 4:
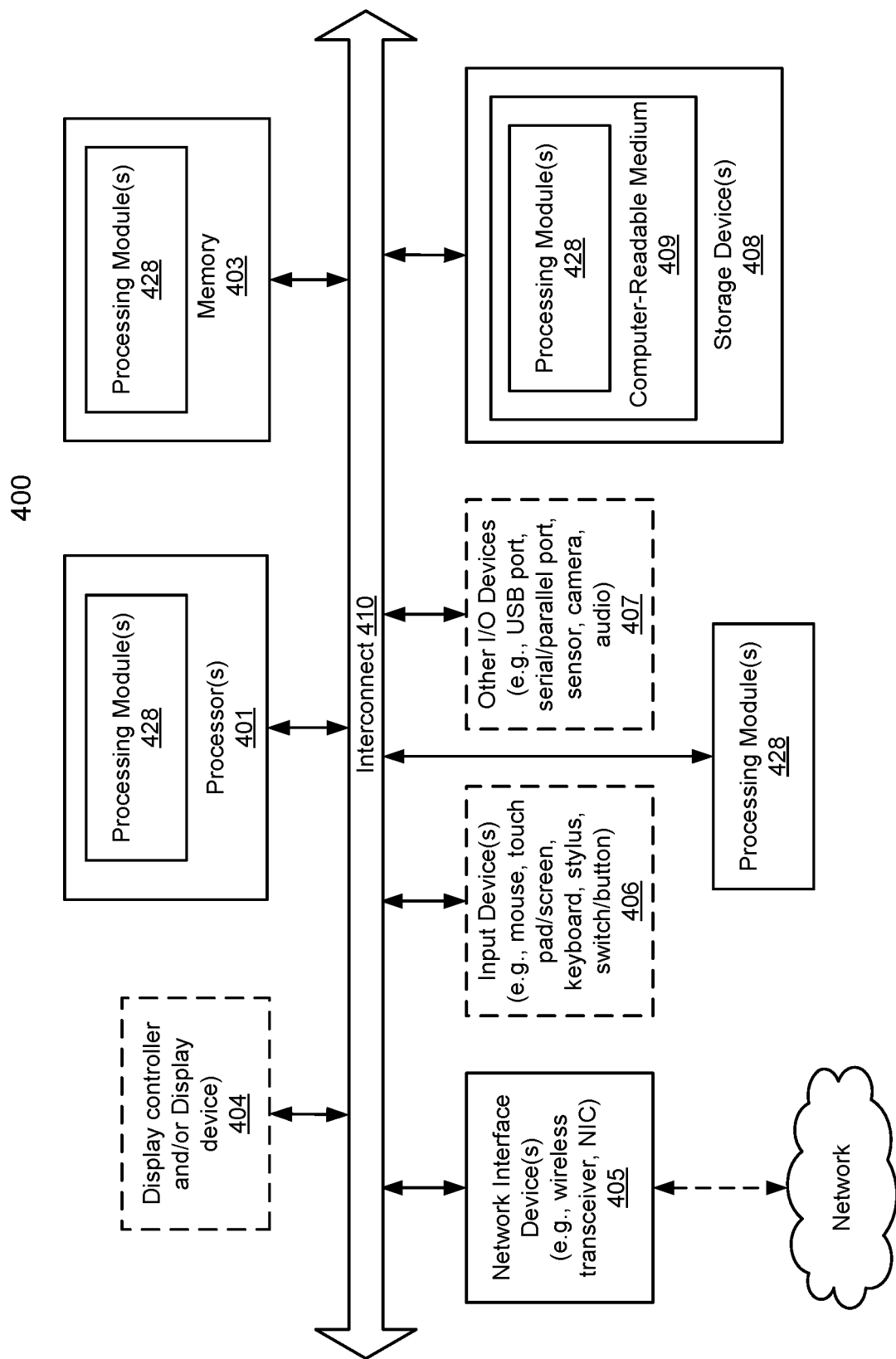
FIG. 4 shows a block diagram illustrating a data processing system in accordance with an embodiment.

Any of the components illustrated in FIGS. 1-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing a deployment, the method comprising:
    obtaining data regarding failures of operation of a set of devices within a network of devices;
    storing the data within a first device, the data regarding the failures of operation of the set of devices within the network of devices;
    generating a network map of the network of devices using the data, the network map comprising pathways and alternate pathways, the alternate pathways comprising a first portion of devices of the set of devices that serve as redundant devices, for a second portion of devices of the set of devices that are members of the pathways, a second portion of devices of the set of devices that have suffered the failures of operation, and the alternate pathways being usable to continue operation of the set of devices while the failures of operation of the set of devices are present; and
    adding a correction factor to the redundant devices along the alternate pathways recorded on the network map to cause the redundant devices to mimic behavior of the second portion of devices of the set of devices that have experienced the failures of operation in order to maintain operation by the deployment.

2. The method of claim 1, further comprising:
    prior to obtaining the data regarding the failures of operation:
        obtaining a set of devices that comprise a network of devices;
        obtaining a first device to store the failures of operations of the set of devices that comprise a network of devices; and
        deploy the set of devices and the first device that stores failures of operation of the set of devices.

3. The method for claim 1, wherein obtaining the data comprises:
    receiving, by the first device, a notice of failure of operation from a first member device within the set of devices within a network of devices, wherein the notice of failure indicates the first member device is failing to operate or will fail to operate in a future point in time.

4. The method for claim 1, wherein obtaining the data comprises:
    receiving, by the first device, a notice of failure of operation from a second member device, wherein the notice of failure indicates that the second member device has observed that a first member device is failing to operate or will fail to operate in a future point in time, wherein the first member device is unable to send the notice of failure of operation, wherein the second member device is within a set of devices within a network of devices.

5. The method for claim 1, wherein storing the data comprises:
    cataloguing a list of devices within the set of devices within the network of devices to document notices of failures of operation for the devices that have been received by the first device, to obtain a catalogue of operational states of devices.

6. The method for claim 5, wherein generating the network map comprises:
    identifying the redundant devices within the set of devices within the network of devices that generate first output similar to operational devices, wherein the first output from the redundant devices may not match second output from the operational devices, and
    adding records to the network map, the records indicating operational pathways that intersect the redundant devices in a case that the operational devices experience failures of operation.

7. The method for claim 6, wherein identifying the redundant devices comprises:
choosing devices within the set of devices within the network of devices that, upon application of the correction factor to the redundant devices, is configured to provide duplicative functionality for the operational devices.

8. The method for claim 6, wherein adding the correction factor comprises:
storing the first output from the redundant devices and the second output from the operational devices;
training a machine learning model to learn differences between the first output from a redundant device and the second output from a failed device, wherein the failed device is one of the set of operational devices that has a failure of operation, wherein the redundant device is one of the set of the redundant devices;
obtaining a correction factor using the trained machine learning model; and
applying the correction factor to the redundant device so that the first output from the redundant device matches the second output from the failed device, wherein the second output from the failed device was generated when the failed device was the operational device.

9. The method for claim 6, wherein applying the correction factor comprises:
modifying functionality of the redundant device to match the functionality of a failed device to facilitate the first output matching the second output.

10. A non-transitory machine-readable medium having instructions stored therein, which when executed by a processor, cause the processor to perform operations for securing a deployment, the operations comprising:
obtaining data regarding failures of operation of a set of devices within a network of devices;
storing the data within a first device, the data regarding the failures of operation of the set of devices within the network of devices;
generating a network map of the network of devices using the data, the network map comprising pathways and alternate pathways, the alternate pathways comprising a first portion of devices of the set of devices that serve as redundant devices, for a second portion of devices of the set of devices that are members of the pathways, a second portion of devices of the set of devices that have suffered the failures of operation, and the alternate pathways being usable to continue operation of the set of devices while the failures of operation of the set of devices are present; and
adding a correction factor to the redundant devices along the alternate pathways recorded on the network map to cause the redundant devices to mimic behavior of the second portion of devices of the set of devices that have experienced the failures of operation in order to maintain operation by the deployment.

11. The non-transitory machine-readable medium of claim 10, wherein the operations further comprise:
prior to obtaining the data regarding the failures of operation:
obtaining a set of devices that comprise a network of devices;
obtaining a first device to store the failures of operations of the set of devices that comprise a network of devices; and
deploy the set of devices and the first device that stores failures of operation of the set of devices.

12. The non-transitory machine-readable medium of claim 10, wherein obtaining the data comprises:
receiving, by the first device, a notice of failure of operation from a first member device within the set of devices within a network of devices, wherein the notice of failure indicates the first member device is failing to operate or will fail to operate in a future point in time.

13. The non-transitory machine-readable medium of claim 10, wherein obtaining the data comprises:
receiving, by the first device, a notice of failure of operation from a second member device, wherein the notice of failure indicates that the second member device has observed that a first member device is failing to operate or will fail to operate in a future point in time, wherein the first member device is unable to send the notice of failure of operation, wherein the second member device is within a set of devices within a network of devices.

14. The non-transitory machine-readable medium of claim 10, wherein storing the data comprises:
cataloguing a list of devices within the set of devices within the network of devices to document notices of failures of operation for the devices that have been received by the first device, to obtain a catalogue of operational states of devices.

15. The non-transitory machine-readable medium of claim 14, wherein generating the network map comprises:
identifying the redundant devices within the set of devices within the network of devices that generate first output similar to operational devices, wherein the first output from the redundant devices may not match second output from the operational devices, and
adding records to the network map, the records indicating operational pathways that intersect the redundant devices in a case that the operational devices experience failures of operation.

16. A data processing system, comprising:
a processor; and
a memory coupled to the processor to store instructions, which when executed by the processor, cause the processor to perform operations for securing a deployment, the operations comprising:
obtaining data regarding failures of operation of a set of devices within a network of devices;
storing the data within a first device, the data regarding the failures of operation of the set of devices within the network of devices;
generating a network map of the network of devices using the data, the network map comprising pathways and alternate pathways, the alternate pathways comprising a first portion of devices of the set of devices that serve as redundant devices, for a second portion of devices of the set of devices that are members of the pathways, a second portion of devices of the set of devices that have suffered the failures of operation, and the alternate pathways being usable to continue operation of the set of devices while the failures of operation of the set of devices are present; and
adding a correction factor to the redundant devices along the alternate pathways recorded on the network map to cause the redundant devices to mimic behavior of the second portion of devices of the set of devices that have experienced the failures of operation in order to maintain operation by the deployment.

17. The data processing system of claim 16, wherein the operations further comprise:
- prior to obtaining the data regarding the failures of operation:
  - obtaining a set of devices that comprise a network of devices;
  - obtaining a first device to store the failures of operations of the set of devices that comprise a network of devices; and
  - deploy the set of devices and the first device that stores failures of operation of the set of devices.

18. The data processing system of claim 16, wherein obtaining the data comprises:
- receiving, by the first device, a notice of failure of operation from a first member device within the set of devices within a network of devices, wherein the notice of failure indicates the first member device is failing to operate or will fail to operate in a future point in time.

19. The data processing system of claim 16, wherein obtaining the data comprises:
- receiving, by the first device, a notice of failure of operation from a second member device, wherein the notice of failure indicates that the second member device has observed that a first member device is failing to operate or will fail to operate in a future point in time, wherein the first member device is unable to send the notice of failure of operation, wherein the second member device is within a set of devices within a network of devices.

20. The data processing system of claim 16, wherein storing the data comprises:
- cataloguing a list of devices within the set of devices within the network of devices to document notices of failures of operation for the devices that have been received by the first device, to obtain a catalogue of operational states of devices.

\* \* \* \* \*